(12) United States Patent
Marjou et al.

(10) Patent No.: US 10,397,784 B2
(45) Date of Patent: Aug. 27, 2019

(54) METHOD FOR AUTHORIZING THE ESTABLISHMENT OF A PEER-TO-PEER STREAM IN A MOBILE TELECOMMUNICATIONS NETWORK

(71) Applicant: Orange, Paris (FR)

(72) Inventors: Xavier Marjou, Lannion (FR); Gaël Fromentoux, Pleumeur Bodou (FR)

(73) Assignee: ORANGE, Paris (FR)

( * ) Notice: Subject to any disclaimer, the term of this patent is extended or adjusted under 35 U.S.C. 154(b) by 237 days.

(21) Appl. No.: 15/322,694

(22) PCT Filed: Jun. 24, 2015

(86) PCT No.: PCT/FR2015/051697
§ 371 (c)(1),
(2) Date: Dec. 28, 2016

(87) PCT Pub. No.: WO2016/001529
PCT Pub. Date: Jan. 7, 2016

(65) Prior Publication Data
US 2017/0142588 A1 May 18, 2017

(30) Foreign Application Priority Data
Jun. 30, 2014 (FR) ...................................... 14 56192

(51) Int. Cl.
*H04L 29/08* (2006.01)
*H04W 12/08* (2009.01)
(Continued)

(52) U.S. Cl.
CPC ......... *H04W 12/08* (2013.01); *H04L 61/2589* (2013.01); *H04L 65/102* (2013.01);
(Continued)

(58) Field of Classification Search
CPC ...... H04W 4/20; H04L 67/104; H04L 67/102; H04L 6/1069; H04L 6/1063
See application file for complete search history.

(56) References Cited

U.S. PATENT DOCUMENTS 8,601,144 B1    12/2013  Ryner
2010/0262709 A1* 10/2010 Hiie ................... H04L 12/1827
                                                        709/231
(Continued)

FOREIGN PATENT DOCUMENTS

EP          1973266 A1    9/2008

OTHER PUBLICATIONS

ETSI (European Telecommunications Standards Institute); Universal Mobile Telecommunications System (UMTS); LTE; Policy and charging control over Rx reference point (3GPP TS 29.214 version 11.8.0 Release 11); Apr. 2013; 56 pages.
(Continued)

*Primary Examiner* — Ellen Tran
(74) *Attorney, Agent, or Firm* — Knobbe, Martens, Olson & Bear, LLP

(57) ABSTRACT

Some embodiments relate to a method of authorizing the establishment of a peer-to-peer stream between two user terminals of a mobile telecommunications network. The method is implemented in a platform of the mobile telecommunications network and comprises receiving, from a server of a peer-to-peer service provider, a request to establish a peer-to-peer stream between a first user terminal and a second user terminal, the establishment request including a stream identifier, the stream identifier including at least an identifier of the first user terminal and an identifier of the second user terminal. The method also comprises deciding whether to authorize the establishment of the peer-to-peer stream between the first user terminal and the second user terminal and sending an authorization or rejection message
(Continued)

for the peer-to-peer stream to a network gateway in charge of controlling the streams transiting on the mobile telecommunications network, the message including the stream identifier.

14 Claims, 4 Drawing Sheets

(51) Int. Cl.
    *H04L 29/06*     (2006.01)
    *H04L 29/12*     (2006.01)
    *H04W 4/20*     (2018.01)

(52) U.S. Cl.
    CPC .......... *H04L 65/1069* (2013.01); *H04L 67/02* (2013.01); *H04L 67/104* (2013.01); *H04L 61/2007* (2013.01); *H04L 61/2514* (2013.01); *H04L 65/1013* (2013.01); *H04L 65/1063* (2013.01); *H04W 4/20* (2013.01)

(56) References Cited

U.S. PATENT DOCUMENTS

| | | | |
|---|---|---|---|
| 2012/0206557 A1* | 8/2012 | Ridges | H04N 21/41407 348/14.02 |
| 2012/0246301 A1* | 9/2012 | Vyrros | H04L 45/745 709/224 |
| 2012/0278466 A1* | 11/2012 | Jallapelli | H04L 12/6418 709/223 |

OTHER PUBLICATIONS

Li L. et al., Research on the Integration of RTCWeb technology with IP multimedia subsystem, Proceedings of the 5$^{th}$ International Congress on Image and Signal Processing (CISP) IEEE, Oct. 16, 2012; pp. 1158-1161; XP-032336306; doi: 10.1109/CISP.2012.6469705; ISBN: 978-1-4673-0965-3.
Penno R. et al., PCP Usage for Quality of Service (Qos) in Mobile Networks; draft-penno-pcp-mobile-qos-00.txt; Internet Engineering Task Force (IETF); Standard Working Draft, Internet Society (ISOC) Jul. 29, 2013, Geneva, Switzerland; XP-015093810; 14 pages.
Oracle; Oracle Communications WebRTC Session Controller Concepts Release 7.0; Nov. 1, 2013; downloaded from the Internet: (URL: http://docs.oracle.com/cd/E40972_01/DOC.70/E40976.pdf); XP-055180129; 12 pages.
Reddy Cisco J. et al., Considerations with WebRTC in Mobile Networks; draft-reddy-rtcweb-mobile-03.txt, May 9, 2013 Internet Task Force (IETF); Standard Working Draft, ISOC, (May 9, 2013); Geneva, Switzerland; 16 pages; XP015091096.
International Search Report and Written Opinion dated Oct. 5, 2015 for Application No. PCT/FR2015/051697, filed Jun. 24, 2015, in 13 pages.
International Preliminary Report on Patentability dated Jan. 3, 2017 for Application No. PCT/FR2015/051697, filed Jun. 24, 2015, in 14 pages.

\* cited by examiner

METHOD FOR AUTHORIZING THE ESTABLISHMENT OF A PEER-TO-PEER STREAM IN A MOBILE TELECOMMUNICATIONS NETWORK

RELATED APPLICATIONS

This application is the U.S. National Phase of Application No. PCT/FR2015/051697 entitled "METHOD FOR AUTHORISING THE ESTABLISHMENT OF A PEER-TO-PEER STREAM IN A MOBILE TELECOMMUNICATIONS NETWORK" filed Jun. 24, 2015, which designated the United States, and which claims the benefit of French Application No. 1456192 filed Jun. 30, 2014.

The present invention relates to the processing of data in a telecommunications network, particularly in a mobile telecommunications network.

It relates more particularly to managing the establishment of peer-to-peer streams in the mobile telecommunications network, at the request of a service provider implementing peer-to-peer services.

"Service provider" is understood to mean any entity able to provide any type of service involving data stream exchanges on the mobile telecommunications network. The data stream may be transported over the network between a user terminal and a dedicated server of the service provider, or may be transported between two user terminals, for example when the data streams are WebRTC ("Web Real Time Communication"). In the latter case, the service provider allows two users to handshake and then exchange WebRTC data streams directly. Although the invention is described specifically in the context of WebRTC streams, it applies to any type of peer-to-peer data stream.

WebRTC is a protocol that allows establishing peer-to-peer (P2P) communications directly between browsers installed on two user terminals. For example, it allows P2P videoconferencing with Exchange Media, P2P file sharing, or VoIP ("Voice over Internet Protocol").

The WebRTC protocol offers three programming interfaces (APIs):
- the MediaStream (MS) API for delivering streams of data from a user (video via webcam, audio via the microphone, etc.);
- the PeerConnection (PC) API for establishing P2P communication between two user browsers and exchanging conversational data streams (audio and video which can be transported using the SRTP/UDP protocol suite);
- the DataChannel (DC) API for exchanging streams of raw data (text or binary data which can be transported using the SCTP/DTLS/UDP protocol suite).

Use of the WebRTC PC and DC APIs generates P2P data streams that generally use the UDP transport protocol ("User Datagram Protocol"), but sometimes also the TCP transport protocol ("Transmission Control Protocol"). "Data stream" is understood here to mean a set of data packets transmitted unidirectionally between two entities (two user terminals using P2P or between a user terminal and a server). A data stream is characterized by a source IP address (that of the stream sender), a source port number, a destination IP address (that of the recipient), a destination port number, and a transport protocol.

When data streams cannot be exchanged using P2P, for example due to NAT ("Network Address Translation") or elements such as a firewall, a technology called ICE ("Internet Communication Engine") used by WebRTC allows exchanging data between web browsers through intermediate media servers or media relays (called TURN servers, for "Traversal Using Relays around NAT"). Communication between web browsers is thus permitted but the routing time for the data is increased.

In mobile access networks using 3G or 4G technology, network operators generally prohibit P2P exchanges between mobile devices, for the following reasons:
- to force the data streams to transit through a network entity applying a network policy (for example a "Policy and Charging Enforcement Function", PCEF, entity) and a metering entity (for example an Online Charging System, OCS, function);
- to force the data streams to transit through stream inspection equipment ("Deep Packet Inspection", DPI) in order to identify the type of stream;
- to force the data streams to transit through DPI equipment to prevent protocols allowing a user (of a mobile PC with a 3G card for example) to manage the mobile PC (with 3G card) of another user.

Thus, most mobile network operators systematically prohibit all P2P streams on 3G or 4G mobile access networks, although P2P can support legitimate services.

Service providers using WebRTC technology are therefore forced to implement TURN media servers to enable mobile-to-mobile WebRTC communications (3G or 4G) to function.

The prohibition of P2P data streams on mobile networks thus poses a triple disadvantage:
- from the user perspective, the quality of experience (QoE) is not as good because the path of the data stream, transporting VoIP ("Voice over Internet Protocol") for example, is longer and the IP delay for audio data increases;
- from the service provider perspective, the cost increases because it must set up and run media servers (Operational expenditures, OPEX, or CAPital expenditures, CAPEX);
- from the perspective of the mobile network operator, latency KPIs place the operator at a disadvantage in measurements made by consumers, regulators (such as the ARCEP ("Autorité de Régulation des Communications Electroniques et des Postes"), or service providers such as Google™.

There is therefore a need:
- for service providers: to implement services under quality of service (QoS) constraints that use P2P mode;
- for users and service providers: to obtain the best possible QoE/cost ratio;
- for mobile network operators: to allow the exchange of P2P data streams over the mobile network while retaining control over the streams exchanged.

The present invention aims to improve this situation.

For this purpose, it proposes a method for authorizing the establishment of a peer-to-peer stream between two user terminals of a mobile telecommunications network, the method being implemented in a platform of a mobile telecommunications network and comprising the steps of:
- receiving, from a server of a provider of a peer-to-peer service, a request to establish a peer-to-peer stream between a first user terminal and a second user terminal, the establishment request comprising a stream identifier, the stream identifier comprising at least an identifier of the first user terminal and an identifier of the second user terminal;
- deciding whether to authorize the establishment of the peer-to-peer stream between the first user terminal and the second user terminal;

sending an authorization or rejection message for the peer-to-peer stream to a network gateway in charge of controlling the streams transiting on the mobile telecommunications network, the authorization or rejection message comprising the stream identifier.

Thus, the network operator can allow the transport of media streams for a peer-to-peer service for users of the mobile network, while retaining control of the authorization or rejection of such peer-to-peer streams. The latency of data streams between users of the mobile network is thus greatly reduced for the authorized streams, which no longer have to pass through a media relay server. "Network platform" is understood to mean any platform capable of communicating with servers of service providers, via an IP type of external network for example Such a platform may be a PCRF platform ("Policy and Charging Rules Function") for example. The network gateway may be a GGSN gateway ("Gateway GPRS Support Node") or P-Gateway for example. No restrictions are placed on the criteria or rules used by the platform to authorize or deny a peer-to-peer stream.

According to one embodiment of the invention, the step of deciding whether to authorize the establishment of the stream may comprise the following steps:
    identifying the peer-to-peer service provider that issued the request;
    deciding whether to authorize the establishment of the peer-to-peer stream between the first and second user terminal, based on the identified service provider.

For this purpose, the platform may comprise a database storing the identifiers of service providers for which peer-to-peer streams can be allowed, for example service providers with which agreements have already been made.

In addition, the service provider may be identified by means of at least one element, contained in the request to establish a peer-to-peer stream, among: a source IP address of the establishment request, an attribute indicating the service provider, or a field in the establishment request identifying the service provider.

No additional data thus needs to be provided by the server of the service provider when sending the request for authorization of the peer-to-peer stream.

This embodiment allows reinforcing the security associated with exchanges between the server of the service provider and the platform of the network operator. The field identifying the service provider in the establishment request may, for example, include a username/password pair.

According to one embodiment of the invention, the stream establishment request may also identify a media type for the peer-to-peer communication, and the decision whether to authorize the establishment of the peer-to-peer stream may depend on the type of media identified.

It is thus possible to have a peer-to-peer stream authorization policy which differs according to the types of media exchanged, as these can vary in terms of bandwidth requirements in particular.

One embodiment may provide that the stream establishment request further identifies a minimum bandwidth value requested for the establishment of the peer-to-peer stream, and the decision whether to authorize the establishment of the peer-to-peer stream may depend on the minimum bandwidth value requested.

Such an embodiment allows giving preference to peer-to-peer streams that consume fewer resources of the mobile network.

In addition, the decision whether to authorize the establishment of the peer-to-peer stream may also depend on an available bandwidth value in the mobile telecommunications network.

This avoids overloading the network, by dynamically controlling the authorization and rejection of peer-to-peer streams according to the available bandwidth.

According to one embodiment of the invention, the stream identifier may comprise a first IP address and a first port number of the first user terminal, a second IP address and a second port number of the second user terminal, and a peer-to-peer communication protocol identifier.

In one embodiment, the authorization or rejection message for the stream may further comprise one or both of the following parameters:
    a value for the quality of service to be implemented for the identified stream;
    a value for the minimum bandwidth to be guaranteed for the identified stream.

Thus, when the platform authorizes a peer-to-peer stream, it also defines the transport parameters for the stream in the mobile network.

The method may further comprise the following steps, implemented in the network gateway in charge of controlling the streams transiting on the mobile telecommunications network, when a packet of a stream between the first user terminal and the second user terminal is received:
    if an authorization message comprising the stream identifier has been received by the network gateway, authorizing the data stream to transit in peer-to-peer mode between the first user terminal and the second user terminal via the mobile telecommunications network;
    if a rejection message comprising the stream identifier has been received by the network gateway, or if the network gateway has not received a stream authorization message comprising the stream identifier, forcing the data stream between the first user terminal and second user terminal to transit through a media relay server.

The rejected streams are thus still allowed to transit, through a media relay server. This makes it possible to trust some types of peer-to-peer streams while having more control over other peer-to-peer streams. The decrease in latency of the peer-to-peer streams thus does not occur at the expense of the security associated with transporting these streams in the mobile network.

In addition, the method may further comprise the following step, implemented in the network gateway in charge of controlling the streams transiting on the mobile telecommunications network:
    upon receipt of an authorization message for a peer-to-peer data stream after having forced the stream to pass through the media relay server, authorizing the data stream to transit in peer-to-peer mode between the first user terminal and the second user terminal via the mobile telecommunications network.

In one embodiment of the invention, the method may further comprise the following step, implemented in the platform:
    receiving, from the peer-to-peer service provider, usage reports relating to peer-to-peer streams authorized on the mobile telecommunications network.

The network operator thus has access to usable data it can no longer obtain by direct measurements on the mobile network.

A second aspect of the invention relates to a computer program product comprising instructions for implementing the method according to the first aspect of the invention, when the program is executed by a processor.

A third aspect of the invention relates to a platform of a mobile telecommunications network, comprising:

a receiving unit adapted for receiving, from a server of a peer-to-peer service provider, a request to establish a peer-to-peer stream between a first user terminal and a second user terminal, the establishment request comprising a stream identifier, the stream identifier comprising at least an identifier of the first user terminal and an identifier of the second user terminal;

a decision unit adapted for deciding whether to authorize the establishment of the peer-to-peer stream between the first and second user terminal;

a transmission unit adapted for sending an authorization or rejection message for the stream to a network gateway in charge of controlling the streams transiting on the mobile telecommunications network, the authorization or rejection message comprising the stream identifier.

A fourth aspect of the invention relates to a system for authorizing the establishment of a peer-to-peer stream between two user terminals of a mobile telecommunications network, the system comprising a network platform according to the third aspect of the invention and a network gateway in charge of controlling the streams transiting on the mobile telecommunications network, the network gateway comprising:

a receiving unit adapted for receiving an authorization or rejection message for the stream, the authorization or rejection message comprising the stream identifier;

a processing unit adapted for, when a packet of a stream between the first user terminal and the second user terminal is received by the receiving unit:

authorizing the data stream to transit in peer-to-peer mode between the first user terminal and the second user terminal via the mobile telecommunications network, if an authorization message comprising the stream identifier has been received by the receiving unit;

forcing the data stream between the first user terminal and the second user terminal to transit through a media relay server, if a rejection message comprising the stream identifier has been received by the receiving unit or if the receiving unit has not received a stream authorization message comprising the stream identifier.

Other features and advantages of the invention will become apparent upon examining the following detailed description and the accompanying drawings in which:

FIG. 1 illustrates a system for authorizing a peer-to-peer stream between first and second user terminals 10.1 and 10.2 according to one embodiment of the invention.

Figure 1:
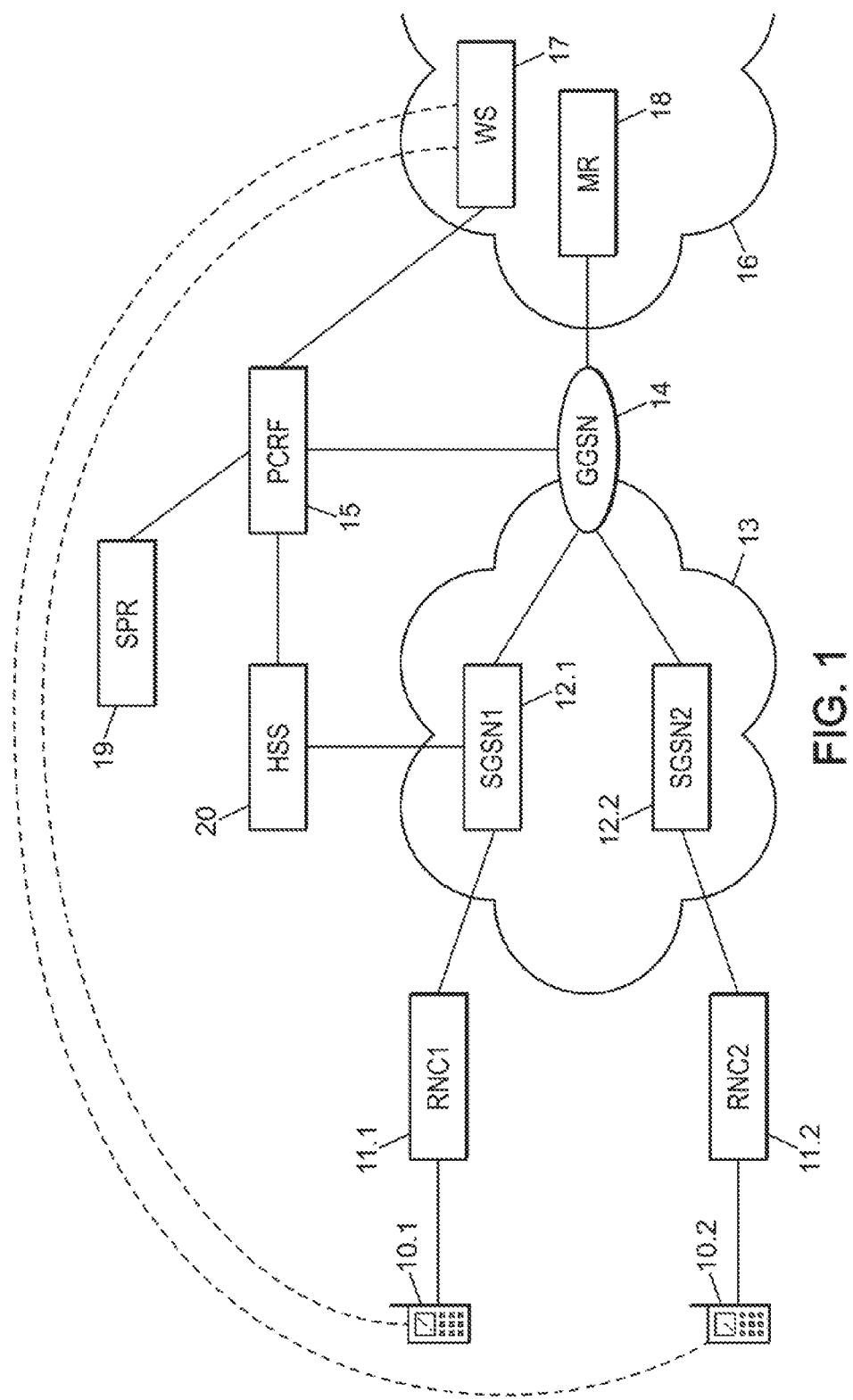
FIG. 1 illustrates a system for authorizing a peer-to-peer stream between first and second user terminals according to one embodiment of the invention.

User terminals 10.1 and 10.2 are mobile terminals with access to a mobile telecommunications network 13 of a network operator. User terminals 10.1 and 10.2 may be mobile phones, for example smartphones.

Access to the network 13 may be provided by respective RNCs 11.1 and 11.2 ("Radio Network Controller"), which control transmissions from base stations ensuring radio exchanges with the user terminals 10.1 and 10.2. The RNCs 11.1 and 11.2 may be interfaced with respective SGSN ("Serving GPRS Support Node") gateways 12.1 and 12.2 that allow routing data to the mobile network 13. The SGSN gateways 12.1 and 12.2 can manage the interface with an external packet network 16 via another network gateway 14, for example GGSN ("Gateway GPRS Support Node") or P-GW.

The GGSN gateway 14 may form an interface with a media relay server 18, through which peer-to-peer data streams between mobile terminals are forced to transit in prior art solutions. The media relay server 18 may be within the domain of a service provider 16 also in charge of a Web server 17, as illustrated in FIG. 1 and in the following description. Alternatively, the server 18 may be outside the domain of the service provider 16 (for example in the telecommunications network 13), in which case it is then indicated to the network operator 13 by the service provider 16.

The function of the media relay server 18 is to allow user terminals, in particular those with WebRTC client modules, to establish network communications in spite of the presence of a firewall or NAT routers between these terminals which would prevent direct P2P communication between the terminals. Such a media relay server 18 may be a TURN media relay server as defined in document RFC 5766 "Traversal Using Relays around NAT (TURN): Relay Extensions to Session Traversal Utilities for NAT (STUN)".

The Web server 17 of the service provider may host a WebRTC application for example. The Web server 17 can communicate, via an Rx interface (defined in the standard "Technical Specification Group Core Network and Terminals; Policy and Charging Control over Rx reference point," 29-214 TS, version 11.8.0 of Mar. 15, 2013) for example, with the network operator and in particular with a platform 15, for example of the PCRF type ("Policy and Charging Rules Function"), able to provide rules to a PCEF function ("Policy and Charging Enforcement Function") hosted by the GGSN gateway 14. The PCRF platform 15 may have access to user subscription data in order to be able to adapt the use of transport resources to the service and the charging profile for the service, based on a user profile. The user subscription data may be stored in an SPR ("Subscription Profile Repository") database 19 for example.

The PCEF function is in charge of implementing the policy by accepting or rejecting the data stream; it polls the PCRF platform 15 via a Diameter Gx interface, for example, to obtain the PCC ("Policy and Charging Control") rules. These rules allow identifying, blocking, associating QoS ("Quality of Service") with the streams, and applying the charging profile.

The PCRF platform 15 of the mobile network operator 13 can be in charge of controlling the balance between user rights to services and the resources allocated to them, and can also be in charge of the relationship, via the Rx interface, with the service providers whose services are supported by the mobile network 13. The PCRF platform 15 can also transmit instructions to the PCEF function.

The locations of the user terminals 10.1 and 10.2 are sent to an HSS server 20 by the SGSNs 12.1 and 12.2, via an S6a interface for example based on the Diameter protocol, or via Diameter agents.

Figure 2:
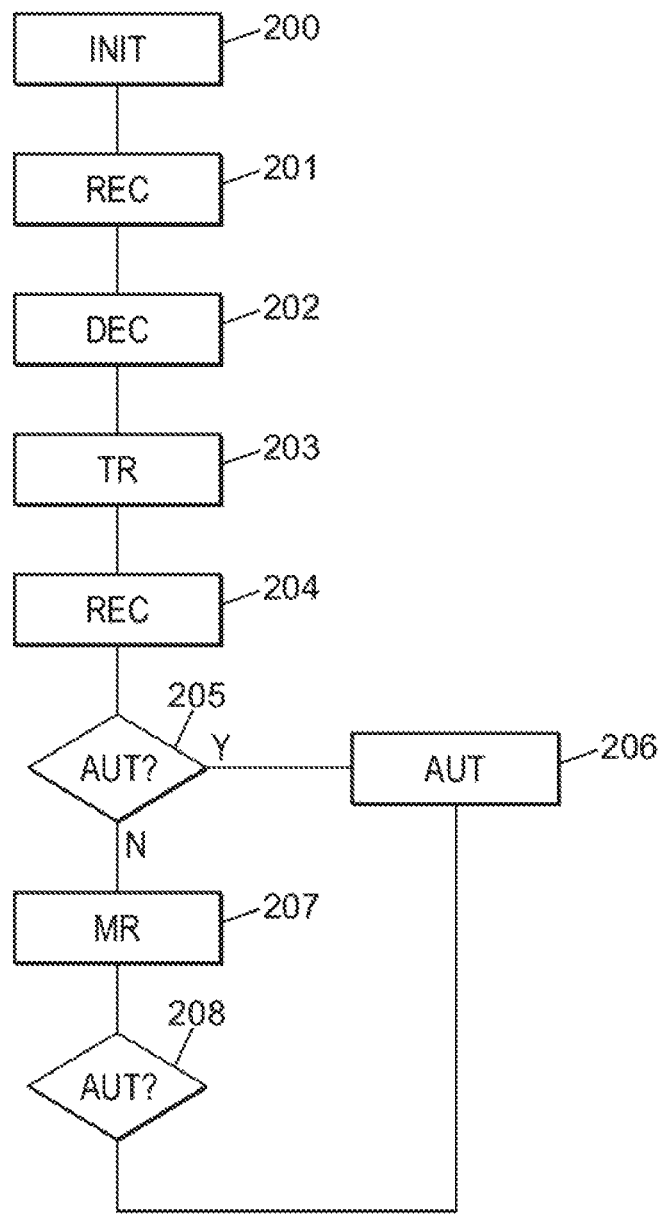
FIG. 2 is a diagram illustrating the steps of a method according to one embodiment of the invention.

FIG. 2 is a diagram illustrating the steps of a method for authorizing the establishment of a peer-to-peer stream between user terminals of a mobile telecommunications network, according to one embodiment of the invention.

In an initial step 200, the first and second user terminals 10.1 and 10.2 access the Web server 17 of the service provider to request a service enabling the exchange of a peer-to-peer data stream between the user terminals (WebRTC service for example).

The Web server 17 identifies the requested stream, for example by means of respective identifiers of the first and second user terminals 10.1 and 10.2. The requested stream may be identified by an IP address and a port number of the first user terminal 10.1, by an IP address and a port number of the second user terminal, and by an identifier of the protocol used for the peer-to-peer service. The Web server 17 may further determine the requirements of the peer-to-peer media stream, for example in terms of bandwidth, connection data (addresses), type of media (audio for example), transport protocol, and/or codecs.

In step 201, the Web server 17 sends the PCRF platform 15 a request to establish a peer-to-peer stream between the first and second user terminals 10.1 and 10.2, the establishment request comprising a stream identifier including at least the identifier of the first user terminal 10.1 and the identifier of the second user terminal 10.2. In particular, the stream identifier may be a 4-tuple formed by the IP address of the source terminal of the requested stream (for example 10.1), the port number of the source terminal of the requested stream, the IP address of the destination terminal of the requested stream (for example 10.2), and the port number of the destination terminal of the requested stream, possibly supplemented by the transport protocol (TCP or UDP) to use for the requested stream in order to construct a stream identifier in the form of a 5-tuple.

The establishment request may also be supplemented by indicating the requirements of the media stream, identified above. Note that the stream establishment request may request establishing a peer-to-peer stream for a plurality of pairs of user terminals.

In step 202, after receiving the stream establishment request in step 201, the PCRF platform 15 can decide whether to authorize the establishment of the peer-to-peer stream between the first user terminal 10.1 and the second user terminal 10.2. No restrictions are placed on the criteria or rules taken into account when authorizing or rejecting the peer-to-peer stream.

For example, the PCRF platform 15 may allow peer-to-peer streams for some service providers, and deny them for others. For this purpose, the PCRF platform 15 may identify from which service provider the establishment request was received from the Web server 17.

The identifier of the service provider 16 may be the source IP address of the establishment request (for example that of the WS server 17), corresponding to the IP address of the peer-to-peer stream establishment request. Alternatively, the establishment request may include a specific field used to identify the service provider 16, for example by inserting a username/password pair corresponding to that service provider in that specific field. In another embodiment, an attribute identifying the service provider may be contained in the establishment request; this attribute may be a URI ("Uniform Resource Identifier") comprising, for example, an address of the Web server 17 of the service provider 16 or a generic identifier of the service provider 16.

Additionally or alternatively, the PCRF platform 15 may also take into account the requested media type for the peer-to-peer stream or a minimum bandwidth value requested in the stream establishment request. For example, establishing the peer-to-peer streams may be authorized if there are sufficient bandwidth resources on the mobile network 13 to allow allocating the minimum bandwidth requested or to allow transport of the requested media type. Taking the above factors into account avoids overloading the mobile network 13 while ensuring satisfactory quality of service for the users of services making use of peer-to-peer streams.

Depending on the decision made in step 202, the PCRF platform 15 transmits (step 203) to the GGSN gateway 14 an authorization or rejection message concerning the establishment of a peer-to-peer stream between the first and second user terminals 10.1 and 10.2, this message comprising the stream identifier discussed above, which identifies the terminals involved in the stream (for example by their respective IP addresses and port numbers). Thus, a stream identifier in the form of a 5-tuple (IP address of the source terminal of the requested stream, port number of the source terminal of the requested stream, IP address of the destination terminal of the requested stream, port number of the destination terminal of the requested stream, transport protocol) can be inserted into such an establishment authorization or rejection message sent to the GGSN gateway 14.

If an acceptance message is transmitted, the message may further include a value of the quality of service to be implemented for the identified stream and/or a value of the minimum bandwidth to guarantee for the identified stream, these values being deduced from the request to establish a peer-to-peer stream.

In step 204, the GGSN gateway 14 receives the authorization or rejection message transmitted in step 202 and extracts said stream identifier, in this case the 5-tuple (IP address of the source terminal of the requested stream, port number of the source terminal of the requested stream, IP address of the destination terminal of the requested stream, port number of the destination terminal of the requested stream, transport protocol), which it may store in association with information corresponding to the type of message (authorization or rejection) received.

In step 205, when the GGSN gateway 14 receives an IP packet of a stream between two user terminals, the GGSN gateway 14 determines whether an authorization message had been previously received for these two user terminals. It may verify this by comparing the source and destination IP addresses and port numbers of the IP packet received with the stream identifiers for which a peer-to-peer stream has been authorized or denied by the PCRF platform 15. If these IP addresses and port numbers ever correspond to the elements of a stored 5-tuple, the GGSN gateway 14 uses the information associated with the 5-tuple to determine whether the stream is authorized or denied.

If a message authorizing the establishment of a peer-to-peer stream has been received in step 203 for user terminals 10.1 and 10.2, the GGSN gateway 14 may, in step 206, authorize a data stream to transit in peer-to-peer mode between the first user terminal 10.1 and the second user terminal 10.2 via the mobile telecommunications network 13. The user terminals 10.1 and 10.2 can then communicate directly in peer to peer mode via the GGSN gateway, without passing through the domain of the service provider 16.

In this case, an authorization request may advantageously be transmitted by the GGSN gateway to the access network, via gateways SGSN1 and SGSN2, the request comprising at least the identifier of the authorized stream, and possibly the data corresponding to the transport policy to be implemented for this stream. Transmission of the authorization request to the access network allows authorizing the peer-to-peer stream in a particular situation where it could be blocked by SGSN gateways or packet inspection probes (DPI) implementing a policy of blocking this type of stream.

However, if a message rejecting the establishment of a peer-to-peer stream has been received in step 203 for user terminals 10.1 and 10.2, or if no message has been received from the PCRF platform 15 for these user terminals, the GGSN gateway 14 may, in step 207, force a data stream between the first user terminal and the second user terminal to transit through the media relay server 18. The data stream between user terminals 10.1 and 10.2 is then redirected to the media relay server 18, whose address was sent by the Web server 17 to the user terminals. The data stream is then a conventional stream routed from the GGSN gateway to the media relay server 18.

In the latter case, a rejection request may advantageously be sent to the access network via gateways SGSN1 and SGSN2, the request comprising at least the identifier of the rejected stream. Sending this rejection request to the access network allows preventing a circumvention of the media relay server 18 by an element of the access network that could authorize direct peer-to-peer streams between the two terminals without going through the GGSN gateway.

If an authorization message for the user terminals 10.1 and 10.2 is subsequently received in step 208, the GGSN gateway 14, which previously forced the data stream to transit through the media relay server 18, can allow a dynamic switching to a direct peer-to-peer data stream between the first user terminal 10.1 and the second user terminal 10.2 via the mobile telecommunications network 13. Here, too, an authorization request may advantageously be transmitted by the GGSN gateway 14 to the access network, the request comprising at least the identifier of the authorized stream, and possibly data corresponding to the transport policy to be implemented for this stream, for the reasons given above.

When the peer-to-peer stream is authorized between the user terminals 10.1 and 10.2, the method may comprise an additional step (not shown) in which the Web server 17, or any other entity of the service provider, can send a report for every volume segment (for example every 100 megabytes), indicating the total volume of data sent and received by browsers (internet browsers and mobile applications, for example) of mobile user terminals using the services of the service provider that are supported in peer-to-peer mode. The report is sent to the operator of the mobile telecommunications network 13 supporting the peer-to-peer traffic.

The service provider can have access to this information from statistics collected via a mechanism such as Getstat for example.

Based on this information, the operator of the mobile telecommunications network can decrease the amount of bandwidth, time, used by each peer-to-peer stream during the communication, and can interrupt the user data streams that have exhausted their account. For example, for a prepaid account corresponding to a certain volume of data, the network operator 13 can stop activation of the peer-to-peer mechanism when the volume of data exchanged in peer-to-peer mode has reached that volume limit.

The network operator 13 can also check the accuracy of reports received from the service providers, by examining a sample WebRTC call (in the example where the service providers are providing a WebRTC type of service) supported in peer-to-peer mode, and making use of unit calls the operator of the network 13 initiates from test terminals. It is thus possible for the network operator 13 to verify that the reports provided by the service provider correspond to what is measured on these test terminals.

Figure 3:
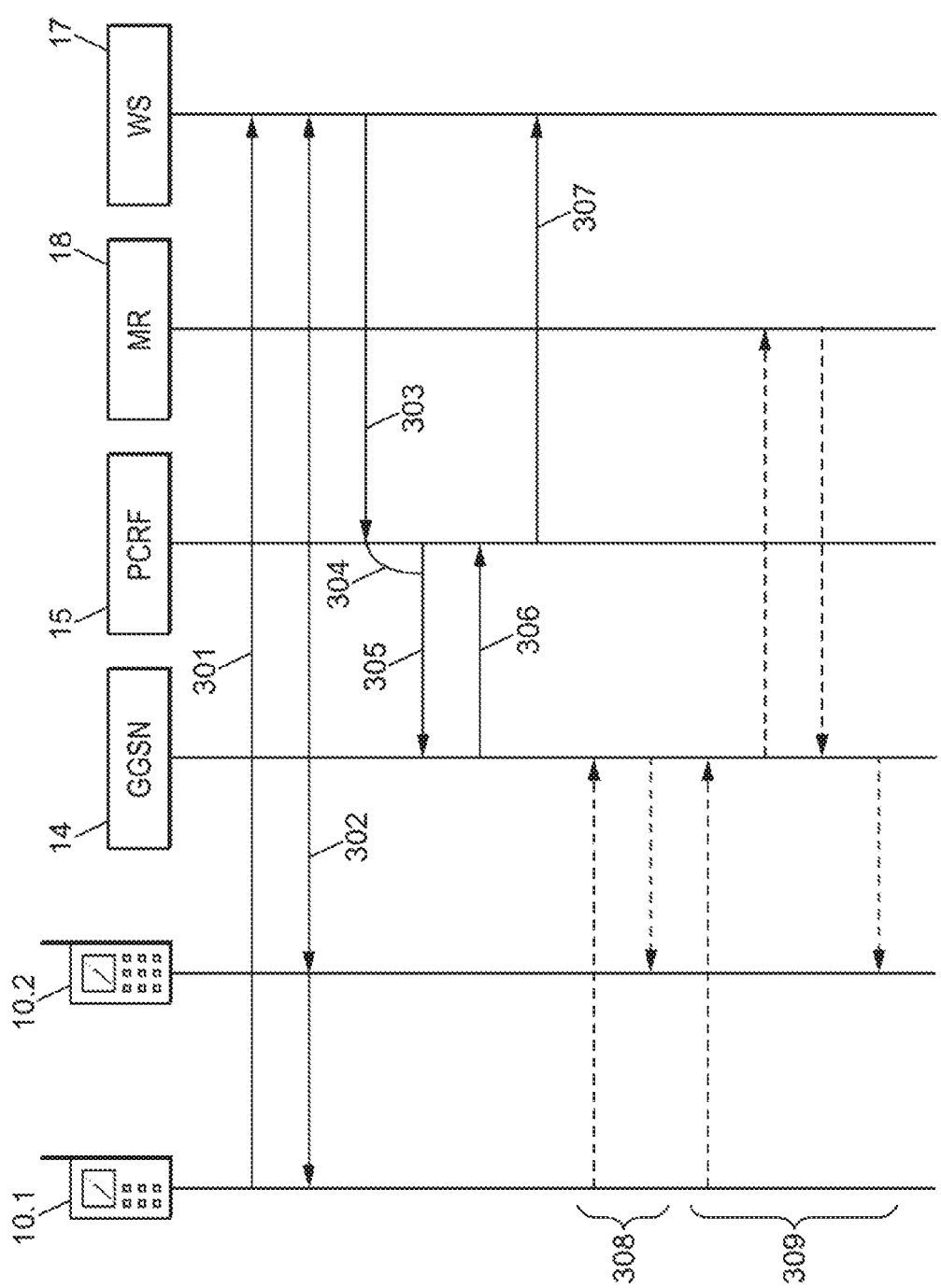
FIG. 3 is a diagram illustrating the exchanges in the system represented in FIG. 1, according to one embodiment of the invention.

FIG. 3 shows a diagram of exchanges between the entities of the system shown in FIG. 1.

In step 301, the first user terminal connects to the Web server 17 and requests the establishment of a peer-to-peer stream with the second user terminal 10.2. In step 302, the Web server 17 of the service provider 16 then obtains the identifiers of the user terminals 10.1 and 10.2.

In step 303, the Web server 17 transmits to the PCRF platform 15 a request to establish a peer-to-peer stream between the first user terminal 10.1 and the second user terminal 10.2, the establishment request identifying the service provider 16 (for example with a generic identifier for the provider or a username/password pair) as well as the requested stream (for example by means of a 5-tuple (IP address of the source terminal of the requested stream, port number of the source terminal of the requested stream, IP address of the destination terminal of the requested stream, port number of the destination terminal of the requested stream, transport protocol)), and possibly the desired transport conditions for the stream (in terms of throughput, QoS parameters, etc.).

Upon receiving the request to establish a peer-to-peer stream, the PCRF platform 15 decides (step 304) whether to authorize the establishment of a peer-to-peer stream between the first user terminal 10.1 and the second user terminal 10.2, for example depending on the identified service provider. The criteria and rules used to authorize or reject the peer-to-peer stream have been described above.

In step 305, the PCRF platform 15 sends an authorization or rejection message for the peer-to-peer stream between the first and second user terminals 10.1 and 10.2, to the GGSN gateway 14, as previously described.

In an optional step 306, the GGSN gateway 14 may send a confirmation of receipt of the authorization or rejection message received in step 305.

In an optional step 307, the PCRF platform 15 may inform the Web server 17 of the decision made in step 304. For this purpose, an acceptance or rejection message for a peer-to-peer stream may be transmitted to the Web server 17.

In a step 308, if the peer-to-peer stream is accepted by the PCRF gateway 15, a media data stream is authorized to transit directly between the first and second user terminals 10.1 and 10.2 via the mobile telecommunications network 13, transiting through the GGSN gateway 14 without passing through the service provider 16.

Conversely, during a step 309, if the peer-to-peer stream is rejected by the PCRF gateway 15, a media data stream between the first and second user terminals 10.1 and 10.2 is forced by the GGSN gateway 14 to transit through the media relay server 18.

Figure 4:
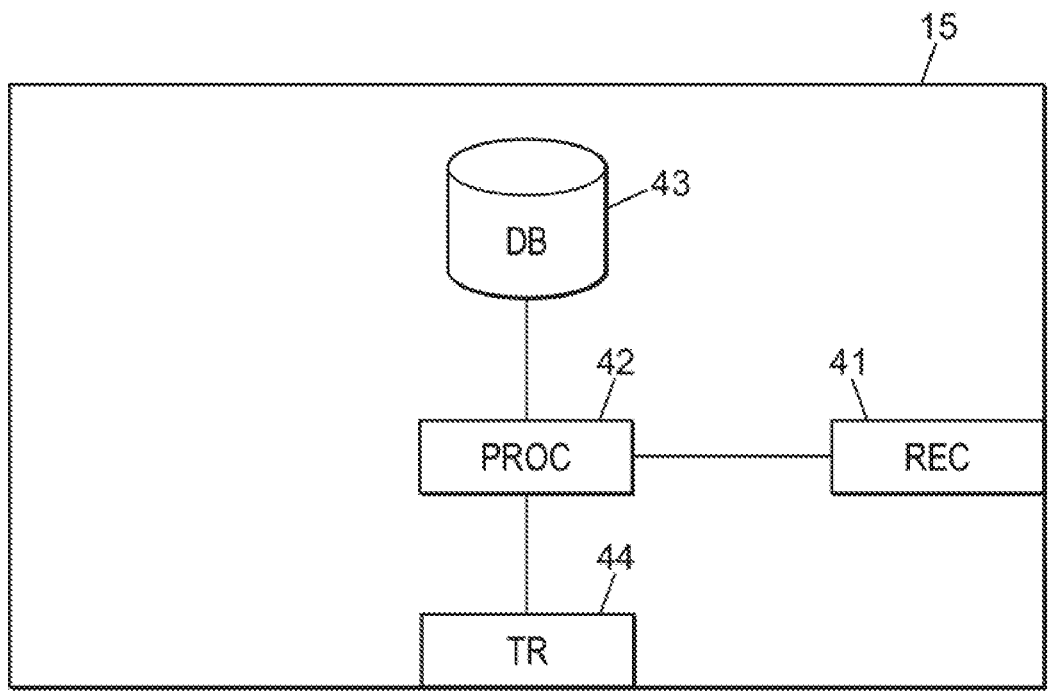
FIG. 4 illustrates a platform of a telecommunications network according to one embodiment of the invention.

FIG. 4 illustrates a platform of a telecommunications network, such as the PCRF platform 15 of FIG. 1.

The PCRF platform 15 comprises a first interface 41 for communicating with service provider servers, and in particular for receiving requests to accept a peer-to-peer stream between user terminals. The first interface 41 may be the Rx interface defined in the aforementioned standard TS 29-214.

The PCRF platform 15 further comprises a processing unit 42 (implemented for example in the form of a processor) able to decide whether to authorize or reject the establishment of a peer-to-peer stream requested by the service providers, as well as a database 43 that can store identifiers of service providers for which peer-to-peer streams may be authorized for example.

A second interface 44 is adapted for communicating with the GGSN gateway 14 and in particular for sending an authorization or rejection message concerning the establishment of a peer-to-peer stream. The second interface may be a Gx interface for example, also defined in the aforementioned standard.

Figure 5:
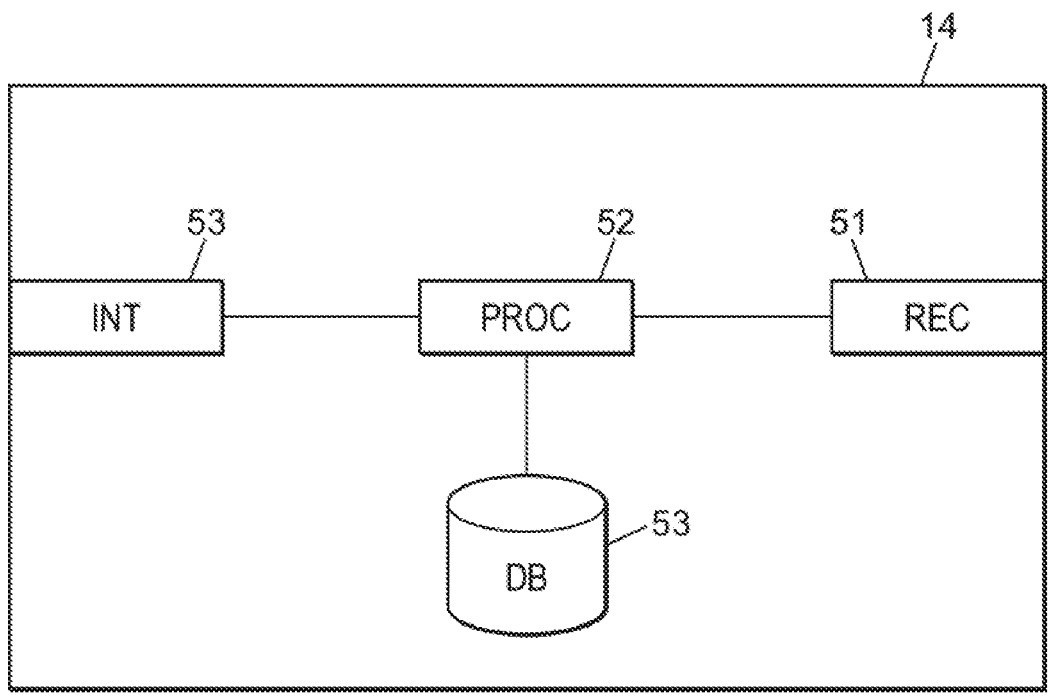
FIG. 5 shows a network gateway according to one embodiment of the invention.

FIG. 5 illustrates a network gateway in charge of controlling the streams transiting on the mobile telecommunications network, such as the GGSN gateway 14 of FIG. 1.

The network gateway 14 comprises a first interface 51 suitable for communicating with the PCRF platform 15, in particular for receiving rejection or authorization messages concerning a peer-to-peer stream. The first interface 51 may be a Gx interface.

The gateway network 14 further comprises a processing unit 52 (implemented for example in the form of a processor) suitable for determining whether to authorize a peer-to-peer stream, and if necessary, for determining the transport policy to be applied in the access network 13, based on messages received from the PCRF platform 15. A database 54 allows maintaining updated stream identifiers mapped to an authorization or rejection decision, and where applicable, to a peer-to-peer transport policy (minimum bandwidth to be allocated, QoS to be provided).

The GGSN gateway 14 comprises a second interface 53 suitable for communicating with the access network, in particular to authorize or reject the establishment of peer-to-peer streams between users, based on the authorization or rejection messages received.

Thus, the invention allows the activation of peer-to-peer streams authorized by the service provider over a mobile network of a telecommunications operator. The latency of peer-to-peer streams is improved, as they do not necessarily have to transit through a third server. The decision whether to authorize the peer-to-peer stream is dependent on the network operator, so it remains possible to force media streams to transit through a media relay server, and the network operator thus retains the ability to inspect and control the streams that transit the mobile network.

Of course, the invention is not limited to the embodiments described and represented above, from which other methods and other embodiments can be conceived without departing from the scope of the invention. The control of streams by a network gateway 14 corresponding to a GGSN gateway has been described, but the invention is not limited to this example. Thus, any network gateway of a communication network transited by data streams between user terminals, and having an interface with a media relay server designated by a service provider as discussed above, is able to control the streams transiting on the network presented herein.

The invention claimed is:

1. A method of authorizing the establishment of a peer-to-peer stream between two user terminals of a mobile telecommunications network, said method being implemented in a platform of the mobile telecommunications network and comprising:

receiving, from a server of a provider of a peer-to-peer service, a request to establish a peer-to-peer stream between a first user terminal and a second user terminal, the establishment request including a stream identifier, the stream identifier including at least an identifier of the first user terminal and an identifier of the second user terminal;

deciding whether to authorize the establishment of the peer-to-peer stream between the first user terminal and the second user terminal; and sending an authorization or rejection message for the peer-to-peer stream to a network gateway in charge of controlling the streams transiting on the mobile telecommunications network, the authorization or rejection message including the stream identifier.

2. The method according to claim 1, wherein the process of deciding whether to authorize the establishment of the stream comprises the following processes:

identifying the peer-to-peer service provider that issued the request; and deciding whether to authorize the establishment of the peer-to-peer stream between the first user terminal and the second user terminal, based on the identified service provider.

3. The method according to claim 2, wherein the service provider is identified via at least one element, included in the request to establish a peer-to-peer stream, said at least one element being selected from the group consisting of a source IP address of the establishment request, an attribute indicating the service provider, and a field in the establishment request identifying the service provider.

4. The method according to claim 1, wherein the stream establishment request further identifies a media type for the peer-to-peer communication, and wherein the decision whether to authorize the establishment of the peer-to-peer stream is dependent on the type of media identified.

5. The method according to claim 1, wherein the stream establishment request further identifies a minimum bandwidth value requested for the establishment of the peer-to-peer stream and wherein the decision whether to authorize the establishment of the peer-to-peer stream is dependent on the minimum bandwidth value requested.

6. The method according to claim 4, wherein the decision whether to authorize the establishment of the peer-to-peer stream is also dependent on an available bandwidth value in the mobile telecommunications network.

7. The method according to claim 1, wherein the stream identifier comprises a first IP address and a first port number of the first user terminal, a second IP address and a second port number of the second terminal user, and a peer-to-peer communication protocol identifier.

8. The method according to claim 1, wherein the authorization or rejection message for the stream further comprises one or both of the following parameters:

a value for the quality of service to be implemented for the identified stream; and/or a value for the minimum bandwidth to be guaranteed for the identified stream.

9. The method according to claim 1, further comprising the following processes, implemented in the network gateway in charge of controlling the streams transiting the mobile telecommunications network, when a packet of a stream between the first user terminal and the second user terminal is received:

if an authorization message including the identifier of said stream has been received by the network gateway, authorizing said data stream to transit in peer-to-peer mode between the first user terminal and the second user terminal via the mobile telecommunications network;

if a rejection message comprising the identifier of said stream has been received by the network gateway, or if the network gateway has not received a stream authorization message including the identifier of said stream, forcing the data stream between the first user terminal and second user terminal to transit through a media relay server.

10. The method according to claim 9, further comprising the following process implemented in the network gateway in charge of controlling the streams transiting on the mobile telecommunications network:

upon receipt of an authorization message for a data stream after having forced the stream to pass through the media relay server, authorizing the data stream to transit in peer-to-peer mode between the first user terminal and the second user terminal via the mobile telecommunications network.

11. The method according to claim 1, further comprising the following process implemented in the platform:

receiving, from the peer-to-peer service provider, usage reports relating to peer-to-peer streams authorized on the mobile telecommunications network.

12. A non-transitory computer readable storage medium having stored thereon instructions, which when executed by a processor, cause the processor to perform a method of authorizing the establishment of a peer-to-peer stream between two user terminals of a mobile telecommunications network, said method being implemented in a platform of the mobile telecommunications network and comprising:

receiving, from a server of a provider of a peer-to-peer service, a request to establish a peer-to-peer stream between a first user terminal and a second user terminal, the establishment request including a stream identifier, the stream identifier including at least an identifier of the first user terminal and an identifier of the second user terminal;

deciding whether to authorize the establishment of the peer-to-peer stream between the first user terminal and the second user terminal; and sending an authorization or rejection message for the peer-to-peer stream to a network gateway in charge of controlling the streams transiting on the mobile telecommunications network, the authorization or rejection message including the stream identifier.

13. A platform of a mobile telecommunications network, said platform being configured to:

receive, from a server of a peer-to-peer service provider, a request to establish a peer-to-peer stream between a first user terminal and a second user terminal, the establishment request including a stream identifier, the stream identifier including at least an identifier of the first user terminal and an identifier of the second user terminal;

decide whether to authorize the establishment of the peer-to-peer stream between the first and second user terminal; and send an authorization or rejection message for the stream to a network gateway in charge of controlling the streams transiting the mobile telecommunications network, the authorization or rejection message including the stream identifier.

14. A system for authorizing the establishment of a peer-to-peer stream between two user terminals of a mobile telecommunications network, said system comprising a network platform according to claim 13 and a network gateway in charge of controlling the streams transiting on the mobile telecommunications network, said network gateway being configured to:

receive an authorization or rejection message for the stream, the authorization or rejection message including the stream identifier;

when a packet of a stream between the first user terminal and the second user terminal is received by the receiving unit:

authorize said data stream to transit in peer-to-peer mode between the first user terminal and the second user terminal via the mobile telecommunications network, if an authorization message including the identifier of said stream has been received by the receiving unit;

force the data stream between the first user terminal and second user terminal to transit through a media relay server, if a rejection message including the identifier of said stream has been received by the receiving unit or if the receiving unit has not received a stream authorization message including the identifier of said stream.

* * * * *